(12) United States Patent
Kuwajima et al.

(10) Patent No.: US 9,421,478 B2
(45) Date of Patent: Aug. 23, 2016

(54) REFRIGERATOR AND COLD TRAP (71) Applicant: CANON ANELVA CORPORATION, Kawasaki-shi (JP)

(72) Inventors: Atsuhiro Kuwajima, Tama (JP); Kenji Kudo, Sagamihara (JP); Daisaku Takano, Kawasaki (JP)

(73) Assignee: CANON ANELVA CORPORATION, Kawasaki-Shi, Kanagawa-Ken (JP)

( * ) Notice: Subject to any disclaimer, the term of this patent is extended or adjusted under 35 U.S.C. 154(b) by 151 days.

(21) Appl. No.: 14/279,382

(22) Filed: May 16, 2014

(65) Prior Publication Data

US 2014/0290282 A1    Oct. 2, 2014

Related U.S. Application Data (63) Continuation of application No. PCT/JP2012/007104, filed on Nov. 6, 2012.

(30) Foreign Application Priority Data

May 11, 2012  (JP) ................. 2012-109660

(51) Int. Cl.
*B01D 8/00* (2006.01)
*F25B 9/14* (2006.01)

(52) U.S. Cl.
CPC ... *B01D 8/00* (2013.01); *F25B 9/14* (2013.01); *F25B 2500/13* (2013.01); *F25B 2600/0253* (2013.01); *Y02B 30/741* (2013.01)

(58) Field of Classification Search
CPC ......... B01D 8/00; F25B 9/14; F25B 2500/13; F25B 2600/0253; Y02B 30/741

USPC ...................................... 62/6, 55.5
See application file for complete search history.

(56) References Cited

U.S. PATENT DOCUMENTS 4,811,563 A * 3/1989 Furuishi ............... F02G 1/0435 60/517
6,131,394 A * 10/2000 Lavietes ............... F04B 39/0027 62/55.5

(Continued)

FOREIGN PATENT DOCUMENTS

JP  10-184541 A   7/1998
JP  2000-088383 A  3/2000

(Continued)

OTHER PUBLICATIONS

Notification of the First Office Action issued in corresponding Chinese Patent Application No. 201280064197.4, dated May 20, 2015.

(Continued)

*Primary Examiner* — Mohammad M Ali
(74) *Attorney, Agent, or Firm* — Buchanan Ingersoll & Rooney PC (57) ABSTRACT

This invention provides a cold trap using a Stirling refrigerator. A refrigerator includes a drive piston configured to drive a free piston so as to reciprocally move a working medium between a heat dissipation portion and a heat absorption portion, a vibration sensor configured to measure a vibration of a case, a dynamic vibration absorber configured to reduce the vibration of the case when the drive piston is driven, and a frequency adjustment device configured to adjust a driving frequency to reduce the vibration of the case when the drive piston is driven in a state in which the case is connected to a vacuum device.

4 Claims, 4 Drawing Sheets

(56) References Cited

U.S. PATENT DOCUMENTS

| | | | |
|---|---|---|---|
| 7,705,479 B2* | 4/2010 | Spenceley | F02G 1/043 290/2 |
| 8,193,496 B2* | 6/2012 | Furry | G01J 5/061 250/330 |
| 2004/0045303 A1* | 3/2004 | Chen | F25B 9/14 62/6 |
| 2005/0039454 A1* | 2/2005 | Shimizu | F02G 1/0435 60/595 |
| 2006/0091310 A1* | 5/2006 | Furry | G01J 5/061 250/330 |
| 2006/0191329 A1* | 8/2006 | Adderton | B82Y 35/00 73/105 |
| 2006/0254270 A1 | 11/2006 | Tanaka | |
| 2007/0268944 A1* | 11/2007 | Voss | H01S 3/036 372/34 |
| 2009/0039655 A1* | 2/2009 | Berchowitz | F02G 1/043 290/1 A |
| 2009/0322445 A1* | 12/2009 | Raidl | H03J 7/02 333/174 |
| 2010/0011783 A1 | 1/2010 | Aoki et al. | |
| 2010/0242721 A1* | 9/2010 | Kim | F04B 35/045 92/261 |
| 2010/0260628 A1* | 10/2010 | Kim | F04B 39/121 417/417 |

FOREIGN PATENT DOCUMENTS

| | | |
|---|---|---|
| JP | 2000-199653 A | 7/2000 |
| JP | 2004-020029 | 1/2004 |
| JP | 2004-309080 A | 11/2004 |
| JP | 2009-017755 A | 1/2009 |
| JP | 2009-019500 A | 1/2009 |

OTHER PUBLICATIONS

International Search Report (PCT/ISA/210) mailed on Feb. 5, 2013, by the Japanese Patent Office as the International Searching Authority for International Application No. PCT/JP2012/007104.

Written Opinion (PCT/ISA/237) mailed on Feb. 5, 2013, by the Japanese Patent Office as the International Searching Authority for International Application No. PCT/JP2012/007104.

International Preliminary Report on Patentability (PCT/IPEA/409) mailed on May 11, 2012 for International Application No. PCT/JP2012/007104.

* cited by examiner

REFRIGERATOR AND COLD TRAP

This application is a continuation of International Patent Application No. PCT/JP2012/007104 filed on Nov. 6, 2012, and claims priority to Japanese Patent Application No. 2012-109660 filed on May 11, 2012, the entire content of both of which is incorporated herein by reference.

TECHNICAL FIELD

The present invention relates to a refrigerator and a cold trap using the refrigerator and, for example, a heat storage refrigerator having a cylinder structure and a cold trap using the refrigerator.

BACKGROUND ART

A cold trap is an evacuating device effectively used to evacuate a vacuum vessel and, more particularly, to eliminate water, and includes a refrigerator for cooling a cold panel arranged in the vacuum vessel. As the refrigerator of the cold trap, conventionally, a GM (Gifford-McMahon) refrigerator is used in general (for example, PTL 1 and PTL 2).

CITATION LIST

Patent Literature

PTL 1: Japanese Patent Laid-Open No. 10-184541
PTL 2: Japanese Patent Laid-Open No. 2009-19500

SUMMARY OF INVENTION

Technical Problem

There is a demand for a compact refrigerator to meet requirements for footprint reduction of a vacuum processing apparatus. However, the GM refrigerator is configured to supply a refrigerant gas compressed by a compressor and is therefore difficult to downsize.

The refrigerator of a cold trap can probably be made compact using a cool storage refrigerator having a cylinder structure such as a free piston Stirling refrigerator. This is because a refrigerator having such a structure is believed to be usable as the refrigerator of a cold trap in terms of cooling capability and size. For example, the free piston Stirling refrigerator (to be referred to as a Stirling refrigerator hereinafter) includes a cooling stage at the distal end of a thin-walled cylinder in which a piston reciprocally moves. A cold panel is attached to the cooling stage via a heat transfer member.

When a driving mechanism using a linear motor is actuated to make the piston reciprocally move, the pressure of a working medium filling the cylinder changes (isothermal compression and isothermal expansion). A displacer thus reciprocally moves while having a phase difference with respect to the piston. During the time in which the working medium moves through the compression space, the heat dissipation portion, the regeneration portion, the heat absorption portion, and the expansion space, heat absorption by the heat absorption portion and heat dissipation by the heat dissipation portion are performed, thereby forming an (isovolumetric change) Stirling cycle. When the piston and the displacer are moved synchronously in the above-described way, a reversible cycle including isothermal compression and isothermal expansion by the change in the pressure of the working medium and heat absorption and heat dissipation by the isovolumetric change during the flow of the working medium is formed. This cools the periphery of the heat absorption portion to a low temperature, and the cooling target is cooled by bringing the heat absorption portion into contact with it.

A problem of the Stirling refrigerator is a vibration that occurs as the piston and the displacer continuously reciprocally move in it. When the vibration of the Stirling refrigerator is transmitted to the vacuum vessel, resonance with a transporter in the vacuum vessel may occur, resulting in displacement of a substrate.

The present invention has been made in consideration of the above-described problem, and has as its object to provide a refrigerator capable of reducing the vibration of a cool storage refrigerator having a cylinder structure such as a Stirling refrigerator. It is another object of the present invention to provide a cold trap using the refrigerator with a reduced vibration.

Solution to Problem

According to the present invention, there is provided a refrigerator comprising a case, a piston capable of reciprocally moving in the case so as to compress and expand a working medium, vibration reduction means for reducing a vibration of the case when the piston is driven, and driving frequency adjustment means for adjusting a driving frequency of the piston to reduce the vibration of the case when the piston is driven in a state in which the case is connected to a vacuum device. Alternatively, according to the present invention, there is provided a cold trap characterized by cooling a cold panel configured to trap gas molecules using the above-described refrigerator.

Advantageous Effects of Invention

It is possible to provide a refrigerator capable of reducing a vibration of a cool storage refrigerator having a cylinder structure such as a Stirling refrigerator. It is also possible to provide a cold trap using the refrigerator with a reduced vibration.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

An embodiment of the present invention will be described with reference to the accompanying drawings. It should be noted that members, arrangements, and the like to be described below are merely specific examples of the present invention and are not intended to limit the scope of the present invention, and various changes and modifications can be made within the spirit and scope of the present invention, as a matter of course. The arrangements of the embodiments to be described can appropriately be combined. The same reference numerals denote parts having the same functions throughout the drawings to be described below, and a description thereof will not be repeated.

Note that in this embodiment, a free piston Stirling refrigerator will be exemplified. However, the present invention is applicable to any refrigerator including a piston that reciprocally moves in a cylinder. In this specifications, "Stirling refrigerator" means a cool storage refrigerator having a cylinder structure in general, unless otherwise specified.

Figure 1:
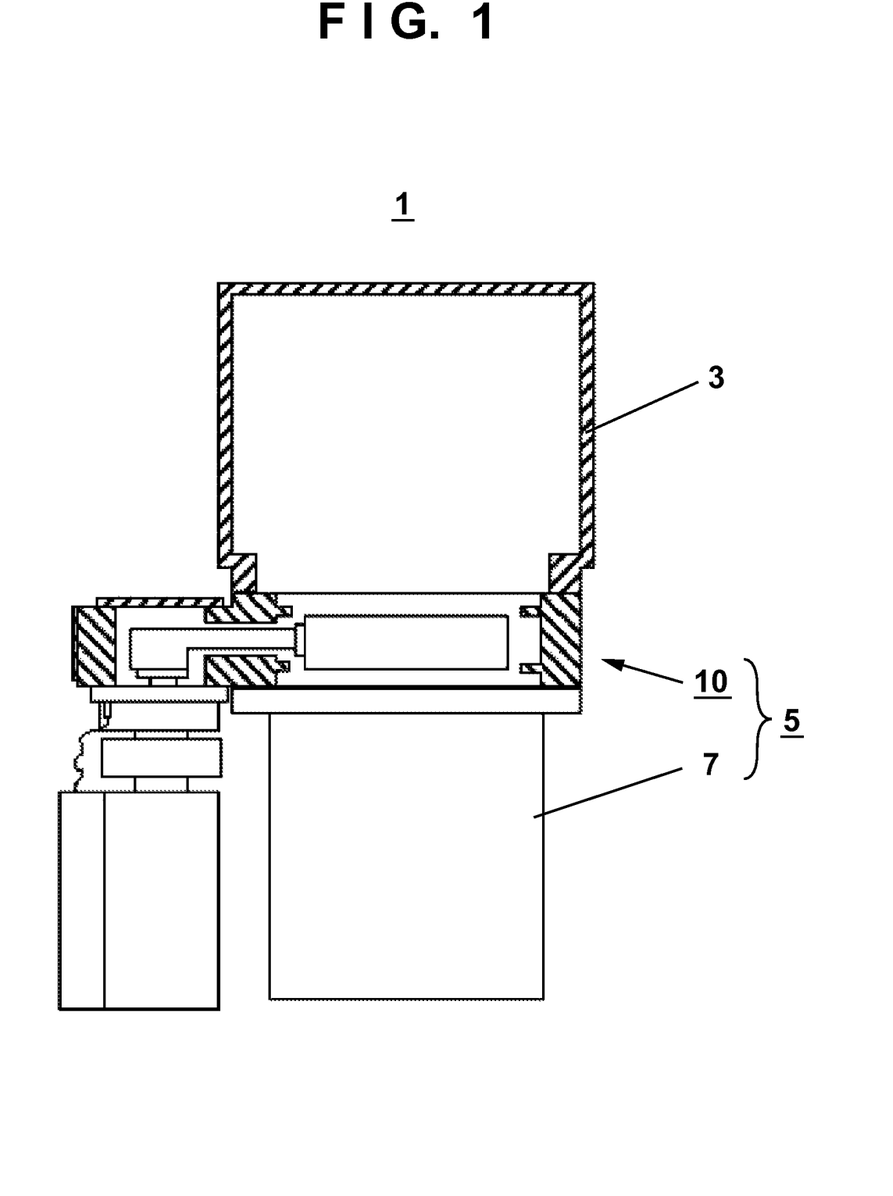
FIG. 1 is a schematic view of a vacuum processing apparatus according to an embodiment of the present invention.
Figure 2:
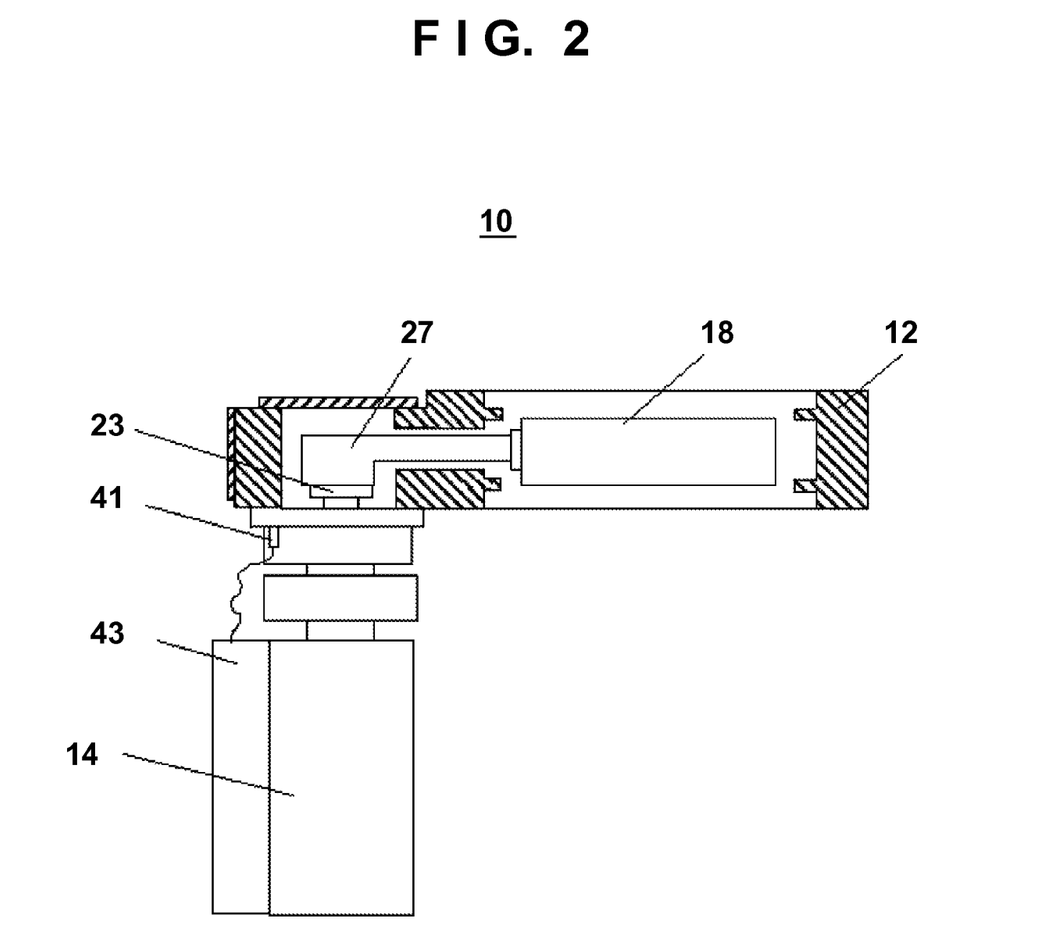
FIG. 2 is a schematic view of a cold trap according to an embodiment of the present invention.
Figure 3:
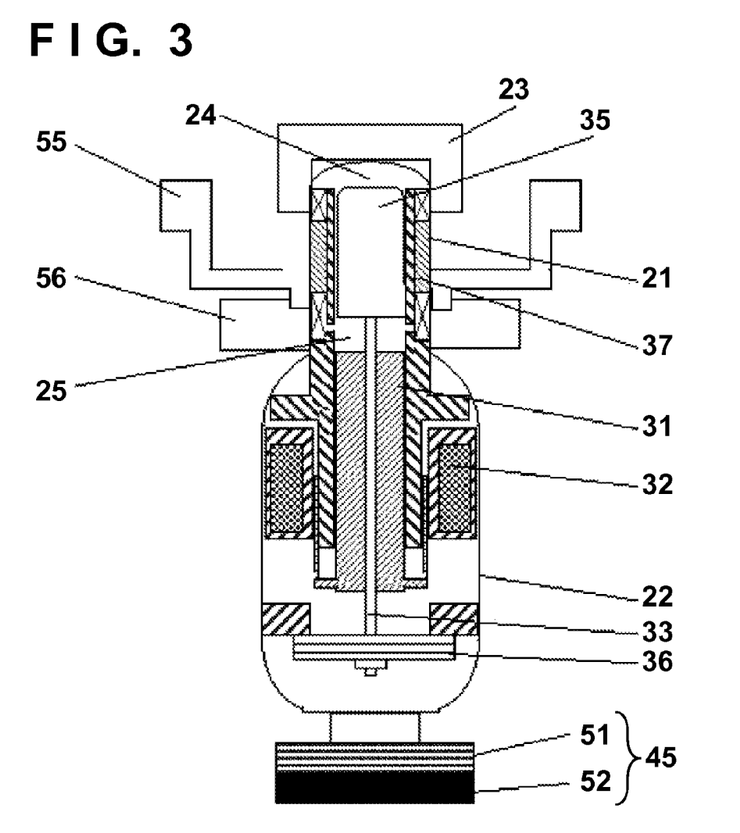
FIG. 3 is a schematic view of the internal structure of a refrigerator according to an embodiment of the present invention.
Figure 4:
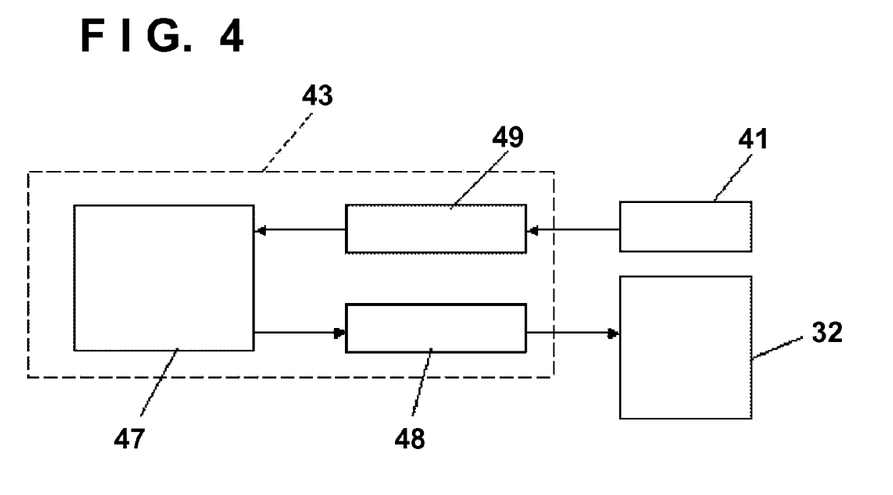
FIG. 4 is a block diagram showing the system configuration of a refrigerator according to an embodiment of the present invention.
Figure 5:
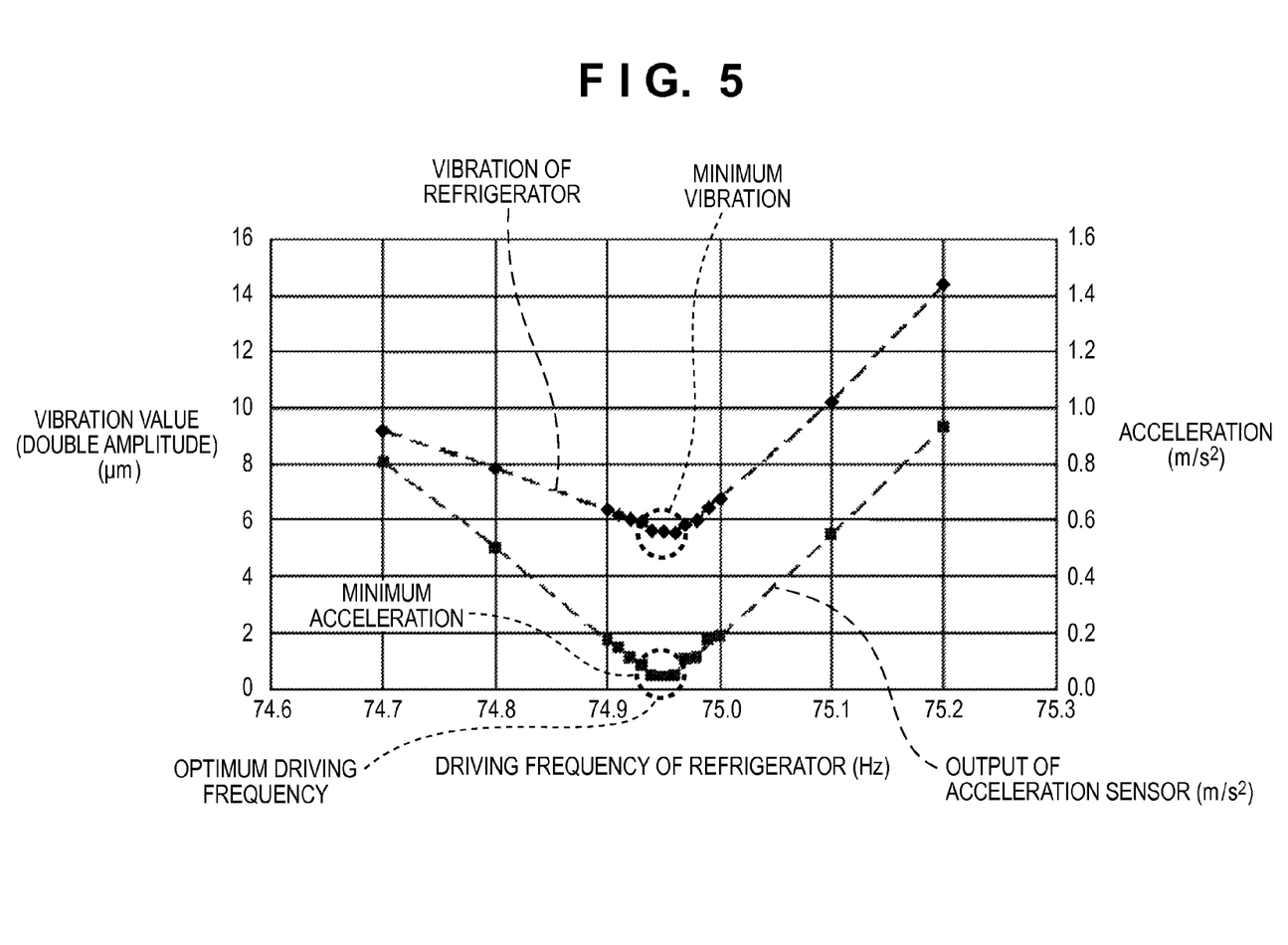
FIG. 5 is a graph showing the relationship between the driving frequency and the vibration value of a refrigerator according to an embodiment of the present invention.

FIG. 1 is a schematic view of a vacuum processing apparatus including a cold trap according to an embodiment of the present invention. FIG. 2 is a schematic view of the cold trap. FIG. 3 is a schematic view of the internal structure of a refrigerator. FIG. 4 is a block diagram showing the system configuration of the refrigerator. FIG. 5 is a graph showing the relationship between the driving frequency and the vibration value of the refrigerator. Note that several components are not illustrated with some exceptions to prevent the drawings from becoming complex.

A vacuum processing apparatus including a cold trap will be described with reference to FIG. 1. A vacuum processing apparatus 1 includes a cold trap 10 and a turbo molecular pump (TMP) 7 as an evacuating device 5 connected to a vacuum vessel 3. In the vacuum vessel 3, predetermined vacuum processing is performed for a process target such as a substrate. The vacuum processing performed in the vacuum vessel 3 is not limited to specific processing and can be, for example, deposition processing by sputtering or CVD or etching processing. The cold trap 10 of this embodiment is attached between the vacuum vessel 3 and the TMP 7. However, the cold trap may be attached inside the vacuum vessel 3. The cold trap 10 and the TMP 7 may be attached to a pipe connected to the vacuum vessel 3. The refrigerator according to the present invention is also applicable as a refrigerator for cooling a substrate holder.

The cold trap will be described with reference to FIG. 2. The cold trap 10 includes a refrigerator 14, a trap vessel 12 connected to the refrigerator 14, and a cold panel 18 (trap portion) that is attached inside the trap vessel 12 to the refrigerator 14 via a heat transfer member 27 and traps a gas from the vacuum vessel 3. The trap vessel 12 is connected to the vacuum vessel 3 and the TMP 7. The heat transfer member 27 is arranged in a cantilever structure with one end connected to a cooling stage 23 of the refrigerator 14 and the other end connected to the cold panel 18.

A vibration sensor 41 is attached to the trap vessel 12. A control unit 43 is attached to the case of the refrigerator 14. A frequency adjustment device that controls the frequency of a linear motor 32 is formed from the control unit 43 and the vibration sensor 41. A damping unit is formed from a dynamic vibration absorber 45 and the frequency adjustment device. The dynamic vibration absorber 45, the frequency adjustment device, and the damping unit will be described later. Note that in this embodiment, the vibration sensor 41 is attached to the trap vessel 12 via a flange 55 (attachment portion). However, the vibration sensor 41 may be attached to a case 22 of the refrigerator 14, the vacuum vessel 3, the cold panel 18, or a member that readily vibrates in the vacuum vessel 3 such as a substrate holder or an arm for substrate transportation. Note that a member to which the refrigerator 14 can be attached is an external vacuum device. At this time, the refrigerator is connected to the vacuum device via an attachment portion. In this case, the attachment portion indicates not only the flange 55 but also a member used to attach the refrigerator to the vacuum device.

The trap vessel 12 is an aluminum vessel that separates the atmosphere and the vacuum and can store the heat transfer member 27 and the cold panel 18. Inside the trap vessel 12, the exhaust port of the vacuum vessel 3, the inlet port of the TMP 7, and the cooling portion of the refrigerator 14 can communicate. In this embodiment, the refrigerator 14 attached to the trap vessel 12 is a free piston Stirling refrigerator capable of cooling the thin-walled cylindrical cold panel 18 to a very low temperature at which the gas molecules of water or the like can be trapped in the vacuum. The cooling portion indicates a range including the cooled portion of a cylinder 21 on the distal end side and the cooling stage 23. The other end side of the cylinder 21 indicates the portion of the cylinder 21 on the side of the cooling stage 23.

The structure of the refrigerator according to this embodiment will be described with reference to FIG. 3. In this embodiment, a free piston Stirling refrigerator (to be referred to as the refrigerator 14 hereinafter) is used. The refrigerator 14 includes the case 22 in which the cylinder 21 (cylinder portion) is formed, and the flange 55 (attachment portion) connected to the trap vessel 12. The cooling stage 23 is provided at the distal end of the cylinder 21.

The refrigerator 14 further includes a heat dissipater 56 formed from a ring-shaped metal member as a heat exhaust mechanism used to exhaust heat from a heat dissipation portion 25 out of the refrigerator main body. The heat dissipater 56 of this embodiment is a structure with a metal fin. However, a structure that introduces a refrigerant such as water inside and exhausts heat via the flowing refrigerant may be employed.

The case 22 has a shape with a thin cylindrical member (cylinder 21) provided on one end side of a cylindrical member. The case incorporates a drive piston 31 (piston) to be reciprocally driven by the linear motor 32 in the longitudinal direction (axial direction) of the cylinder 21, a free piston 35 (second piston) provided to be reciprocally movable in the same direction as the drive piston 31, a phase adjustment spring 36 that adjusts the phase of the motion of the free piston 35, a connecting shaft 33 that connects the free piston 35 and the phase adjustment spring 36. Out of these members, the free piston 35 is arranged inside the cylinder 21.

A working medium fills the space between the drive piston 31 and the free piston 35. As the working medium, for example, helium gas is usable. However, another gas may be used. The outer surface of the free piston 35 can move while forming a slight gap with respect to the internal member of the cylinder 21. The drive piston 31 can be driven while forming a slight gap with respect to the internal member of the case 22 filled with the working medium. Hence, the working medium can be moved by the motion of the drive piston 31 and the free piston 35.

When the drive piston 31 is driven while ensuring a predetermined phase difference with respect to the free piston 35, and the operation of the free piston 35 is synchronized in the axial direction, a reversible cycle including isothermal compression and isothermal expansion by a change in the pressure of the working medium and heat absorption and heat dissipation by an isovolumetric change during the flow of the working medium is formed. This cools the peripheral members of a heat absorption portion 24.

The heat absorption portion 24 (expansion space) in which the working medium is expanded is defined on the distal end side of the cylinder 21. The heat dissipation portion 25 (compression space) in which the working medium is compressed is defined in the space between the free piston 35 and the drive piston 31. A heat exchanger 37 is provided in the channel of the working medium between the heat dissipation portion 25 and the heat absorption portion 24. In the heat dissipation portion 25, since heat is dissipated from the working medium compressed by the free piston 35 and the drive piston 31, the heat dissipater 56 serving as a heat dissipation portion is provided at the lower end outside the cylinder 21 in contact with the heat dissipation portion 25. In the heat absorption portion 24, since heat is absorbed from the working medium that is expanded by the motion of the free piston 35 and the drive piston 31, the cooling stage 23 is provided at a position in contact with the heat absorption portion 24. The heat absorption portion 24 and the heat dissipation portion 25 are partitioned by the free piston 35.

The drive piston 31 and the free piston 35 are members that push or draw the working medium and make it reciprocally move between the heat absorption portion 24 and the heat dissipation portion 25 by their motion. For this reason, the drive piston 31 and the free piston 35 preferably have a sectional shape conforming to the internal shape of the portion where they move. The drive piston 31 and the free piston 35 can have not only a cylindrical shape but also a plate shape (valve structure). The flange 55 is provided at a position between the heat absorption portion 24 and the heat dissipation portion 25. Heat dissipation can easily be done by arranging the heat absorption portion 24 on the vacuum side and the heat dissipation portion 25 on the atmosphere side.

When the refrigerator 14 is operated, and the cooling stage 23 at the upper portion of the refrigerator 14 is cooled, cold is transmitted from the cooling stage 23 to the heat transfer member 27, and the cold panel 18 connected to the heat transfer member 27 is cooled. The heat transfer member 27 is a copper member directly arranged on the cooling stage 23 and transfers the cold of the cooling stage 23 to the cold panel 18.

Water coming from the vacuum vessel 3 or water returned from side of the turbo molecular pump 7 is trapped by the surface of the cooled cold panel 18. The cooling stage 23, the heat transfer member 27, and the cold panel 18 are fixed by screws. Each member is attached with an indium sheet (not shown) inserted on the connection surface for excellent heat transfer.

The damping unit will be described. The damping unit is formed from the dynamic vibration absorber 45 (vibration reduction means) and the frequency adjustment device (driving frequency adjustment means). The frequency adjustment device includes at least the control unit 43.

The dynamic vibration absorber 45 is formed from a spring 51 (elastic member) attached to the case 22, and a vibrator 52 (weight) attached to the spring 51. The vibrator 52 is formed from a metal member or the like. The spring 51 is formed from a coil spring or a leaf spring and has one end connected to the side of the case 22 and the other end connected to the vibrator 52 (weight). When an eigenfrequency f of the dynamic vibration absorber 45 is adjusted, the vibrator 52 vibrates at a phase angle that cancels the vibration of the refrigerator 14. The driving frequency of the drive piston 31 at which the dynamic vibration absorber 45 can absorb a vibration best is called a set frequency (preset driving frequency). The set frequency is set so as to match the driving frequency at which the performance of the refrigerator 14 can sufficiently be exploited.

The eigenfrequency f of the dynamic vibration absorber 45 is determined by the spring constant of the spring 51 and the weight of the vibrator 52. The dynamic vibration absorber 45 of this embodiment is provided at the bottom portion of the case 22 such that the operation axis of driving of the drive piston 31 becomes coaxial to the operation axis of vibration of the vibrator 52 of the dynamic vibration absorber 45. This arrangement can efficiency reduce the vibration.

The dynamic vibration absorber 45 is initialized to minimize the vibration of the refrigerator 14 when the drive piston 31 is driven at the set frequency in a state in which the case 22 (refrigerator 14) is not connected to the vacuum vessel or the like. If the installation environment of the refrigerator 14 is changed by, for example, connecting it to the vacuum vessel, the driving frequency at which the dynamic vibration absorber 45 can effectively suppress a vibration may change. That is, when the refrigerator 14 is driven at the set frequency in a state in which the refrigerator 14 is attached to the vacuum vessel, the dynamic vibration absorber 45 may be unable to sufficiently reduce the vibration. In this case, the frequency adjustment device adjusts the driving frequency to reduce the vibration of the case 22. That is, the vibration of the refrigerator 14 can be reduced by adjusting the driving frequency of the refrigerator 14 to the driving frequency at which the dynamic vibration absorber 45 can reduce the vibration best in the state in which the case 22 (refrigerator 14) is attached to the vacuum vessel.

As described above, the vibration sensor 41 is provided on the trap vessel 12, and the control unit 43 is provided on the case 22 of the refrigerator. The frequency adjustment device is an adjustment device for the piston driving frequency (driving frequency) of the refrigerator. The frequency adjustment device adjusts the driving frequency of the drive piston 31 so as to minimize the vibration while referring to the measured value from the vibration sensor 41.

The system configuration of the frequency adjustment device will be described with reference to FIG. 4. The frequency adjustment device of the refrigerator 14 includes the control unit 43 that controls the driving frequency of the drive piston 31 based on the measured value of the vibration sensor 41. The control unit 43 is connected to the vibration sensor 41 that senses the vibration of the trap vessel 12. The control unit 43 includes, as main constituent elements, a bandpass filter 49 that filters a signal from the vibration sensor 41, an arithmetic unit 47 that processes the signal sent from the vibration sensor 41 via the bandpass filter 49, and an inverter 48 that controls the AC power of the driving frequency of the linear motor 32 based on a control signal from the arithmetic unit 47. The arithmetic unit 47 includes constituent elements (for example, arithmetic circuit and memory circuit) necessary for arithmetic processing of calculating the driving frequency. The control signal output from the arithmetic unit 47 is a value corresponding to the driving frequency output from the inverter 48.

The vibration sensor 41 of this embodiment may be mounted on a control board to which the arithmetic unit 47 is attached, and the control board itself may be mounted on the refrigerator 14 or another vacuum device. In this embodiment, an acceleration sensor is used as the vibration sensor 41 that measures the vibration of the refrigerator 14. However, a speed meter or a displacement gauge may be used instead.

The signal output from the vibration sensor 41 is sent to the arithmetic unit 47 through a center frequency changeable bandpass filter (to be referred to as the bandpass filter 49 hereinafter). The bandpass filter 49 can adjust the center value of the frequency band to pass based on the input control signal. As the control signal input to the bandpass filter 49, a control signal (the control signal of the inverter) corresponding to the driving frequency at which the drive piston 31 is driven is frequency-divided and input. As a result, the center frequency of the frequency band to be passed by the bandpass filter is automatically adjusted to the driving frequency at which the drive piston 31 is driven, and the vibration signal from the vibration sensor 41 can be detected at a predetermined filter strength independent of the driving frequency. This arrangement can make the vibration signal values for the respective driving frequencies during the search correlate with each other. The bandpass filter 49 uses a higher-order filter with respect to the center frequency. This aims at inputting the vibration signal to the arithmetic unit 47 in a state in which vibration signals and noise other than the vibration of the refrigerator 14 are removed.

As the bandpass filter 49, a switched capacitor or the like is usable. A software filter may also be used as the bandpass filter 49. At this time, the signal from the vibration sensor 41 is directly input to the arithmetic unit 47. The arithmetic unit 47 calculates a control signal corresponding to the driving frequency that minimizes the vibration based on the signal from the vibration sensor 41 and outputs the control signal to the inverter 48. The inverter 48 supplies AC power of the driving frequency corresponding to the control signal from the arithmetic unit 47 to the linear motor 32 of the refrigerator 14, and the drive piston 31 is driven at the driving frequency.

Even when the software filter is used as the bandpass filter 49, as described above, a software configuration for extracting a vibration signal on the periphery of the driving frequency is formed. The arithmetic unit 47 records the signal values from the vibration sensor 41 while changing the driving frequency without deteriorating the capability of the refrigerator 14. The driving frequency (optimum driving frequency) that minimizes the vibration is searched from the recorded signal values from the vibration sensor 41, and the drive piston 31 is driven at the frequency. That is, in the arithmetic unit 47, an operation of searching for the driving frequency that minimizes the vibration value measured by the vibration sensor 41 is performed while controlling the inverter 48 and changing the driving frequency of the refrigerator 14.

A change in the optimum driving frequency caused by attaching the refrigerator to the vacuum device such as the vacuum vessel 3 or the trap vessel 12 is small. For this reason, the optimum driving frequency can be specified by searching for a frequency near the set frequency. A change in the optimum driving frequency caused by, for example, aging of the constituent members such as the spring 51 also has a small value, like the change in the optimum driving frequency when the refrigerator 14 is attached to the vacuum device. Hence, the same handling as described above is possible.

Since the change in the optimum driving frequency which occurs due to the above-described reason is small, the performance of the refrigerator is not affected even when the driving frequency is corrected, and the drive piston 31 is driven at the changed driving frequency. Even when the optimum driving frequency largely changes due to another reason, the driving frequency to be searched is set within such a range that does not deteriorate the performance of the refrigerator 14. For this reason, the driving frequency is not changed as the performance of the refrigerator 14 lowers. More specifically, when the set frequency of the dynamic vibration absorber 45 has shifted from the optimum driving frequency due to an ex post reason, the frequency adjustment device according to the embodiment of the present invention reduces the vibration of the refrigerator 14 by driving the drive piston 31 at the driving frequency (changed optimum driving frequency) at which the performance of the refrigerator 14 does not deteriorate, and the dynamic vibration absorber 45 can reduce the vibration best in that state.

In this embodiment, adjusting the driving frequency of the drive piston 31 when the driving frequency (optimum driving frequency) at which the dynamic vibration absorber 45 can reduce the vibration best is changed by attaching the cold trap 10 to the vacuum vessel 3 has been described. However, the vibration of the refrigerator 14 or the cold trap 10 can be reduced by adjusting the driving frequency of the drive piston 31 even when the driving frequency changes due to, for example, aging of the spring of the dynamic vibration absorber 45.

The relationship between the driving frequency and the vibration value of the refrigerator will be described with reference to FIG. 5. In this embodiment, a case will be explained in which the refrigerator is initialized such that the vibration is minimized when the driving frequency of the refrigerator is 75.00 Hz (set frequency), and the vibration of the refrigerator is minimized at a driving frequency of 74.95±0.01 Hz due to the influence of attachment to the vacuum vessel 3.

FIG. 5 also shows the signal (vibration value) of an acceleration sensor measured by the above-described search method when changing the driving frequency from 74.7 Hz to 75.3 Hz. The driving frequency (optimum driving frequency) at which the vibration of the refrigerator is minimized is obtained as 74.95±0.01 Hz by the search according to the above-described search method. That is, the refrigerator is driven at 74.95±0.01 Hz at which the vibration of the refrigerator is minimized. With this operation, the driving frequency of the drive piston 31 of the refrigerator changes from 75.00 Hz to 74.95±0.01 Hz. However, a change to this extent hardly deteriorates the performance of the refrigerator.

According to the present invention, it is possible to provide a refrigerator with a reduced vibration. According to the present invention, it is also possible to provide a cold trap using the refrigerator with a reduced vibration. Providing the refrigerator or a damping unit formed from a dynamic vibration absorber and a driving frequency adjustment device (frequency adjustment device) makes it possible to further reduce the vibration of the refrigerator or the cold trap.

Even when the refrigerator includes no frequency adjustment device, a refrigerator or cold trap capable of reducing a vibration to some extent can be provided. However, the dynamic vibration absorber is initialized so as to minimize the vibration when the Stirling refrigerator is operated at the set frequency. For this reason, when the driving frequency at which the dynamic vibration absorber can effectively suppress a vibration changes, the conventional refrigerator needs an operation of physically adjusting the mass of vibrator of the dynamic vibration absorber by adding/removing a screw or a magnet to/from the vibrator. In addition, the above-described difficult operation needs to be performed again because of the shift of the eigenfrequency of the dynamic vibration absorber, resonance with a member in the vacuum vessel, ambient temperature, aging deterioration of the spring of the dynamic vibration absorber, or the like when the conventional refrigerator is mounted on the vacuum vessel.

When the refrigerator includes the dynamic vibration absorber and the frequency adjustment device, like the refrigerator 14 according to the embodiment of the present invention, the refrigerator can easily and reliably change the driving frequency to the optimum driving frequency even when the driving frequency (optimum driving frequency) at which the dynamic vibration absorber can reduce the vibration best changes. For this reason, the refrigerator or the cold trap can effectively reduce the vibration. At this time, the operation of adjusting the mass of the vibrator of the dynamic vibration absorber by adding/removing a screw or a magnet is unnecessary, and the maintenance time can largely be shortened. In addition, the same effects as described above can be obtained by using the vibration reduction method of the cold trap according to the embodiment of the present invention.

The present invention is not limited to the above embodiments and various changes and modifications can be made within the spirit and scope of the present invention. Therefore, to apprise the public of the scope of the present invention, the following claims are made.

REFERENCE SIGNS LIST

1 . . . vacuum processing apparatus
3 . . . vacuum vessel
5 . . . evacuating device
7 . . . turbo molecular pump (TMP)
10 . . . cold trap
12 . . . trap vessel
14 . . . refrigerator
18 . . . cold panel
21 . . . cylinder
22 . . . case
23 . . . cooling stage
24 . . . heat absorption portion
25 . . . heat dissipation portion
27 . . . heat transfer member
31 . . . drive piston
32 . . . linear motor
35 . . . free piston
36 . . . phase adjustment spring
37 . . . heat exchanger
41 . . . vibration sensor
43 . . . control unit
45 . . . dynamic vibration absorber
47 . . . arithmetic unit
48 . . . inverter
49 . . . bandpass filter
51 . . . spring
52 . . . vibrator (weight)
55 . . . flange
56 . . . heat dissipater

The invention claimed is:

1. A cold trap including a refrigerator, a trap vessel arranged between the refrigerator and a vacuum vessel, and a cold panel arranged in the trap vessel and cooled by the refrigerator to trap gas molecules, the cold trap comprising a vibration sensor configured to detect a vibration in the cold trap, the refrigerator comprising:
a case;
a piston capable of reciprocally moving in the case so as to compress and expand a working medium;
a dynamic vibration absorber attached outside the case and configured to reduce the vibration when the piston is driven; and
a driving frequency adjustment unit configured to adjust a driving frequency of the piston to increase a vibration reduction effect of the dynamic vibration absorber based on a signal from the vibration sensor,
wherein the driving frequency adjustment unit comprises:
a bandpass filter configured to process the signal from the vibration sensor;
an arithmetic processor configured to output a control signal to reduce the vibration based on the signal processed by the bandpass filter; and
a driving unit configured to drive the piston at the driving frequency corresponding to the control signal from the arithmetic processor.

2. The cold trap according to claim 1, wherein
the dynamic vibration absorber comprises a weight, and an elastic member having one end connected to the case and the other end connected to the weight, and
the driving frequency adjustment unit searches for the driving frequency of the piston at which the vibration is minimized while changing the driving frequency.

3. The cold trap according to claim 1, wherein the refrigerator further comprises a second piston configured to reciprocally move in the case while having a predetermined phase difference with respect to the piston and arranged between a space where the working medium is compressed and a space where the working medium is expanded.

4. The cold trap according to claim 1, wherein the bandpass filter has a variable center frequency, and the center frequency is adjusted based on the control signal.

* * * * *